United States Patent
Vermande (10) Patent No.: US 10,626,965 B2
(45) Date of Patent: Apr. 21, 2020

(54) FAILSAFE BAR CONNECTION

(71) Applicant: Ratier-Figeac SAS, Figeac (FR)

(72) Inventor: Frédéric Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 287 days.

(21) Appl. No.: 15/698,770

(22) Filed: Sep. 8, 2017

(65) Prior Publication Data

US 2018/0072403 A1 Mar. 15, 2018

(30) Foreign Application Priority Data

Sep. 15, 2016 (EP) ..................................... 16306174

(51) Int. Cl.
| | |
|---|---|
| *F16H 1/24* | (2006.01) |
| *F16H 55/02* | (2006.01) |
| *F16H 25/20* | (2006.01) |
| *B64C 13/28* | (2006.01) |
| *F16H 57/01* | (2012.01) |

(52) U.S. Cl.
CPC ......... *F16H 25/205* (2013.01); *B64C 13/341* (2018.01); *F16H 25/2015* (2013.01); *F16H 25/2021* (2013.01); *F16H 2025/2037* (2013.01); *F16H 2057/018* (2013.01)

(58) Field of Classification Search
CPC ............... F16H 25/205; F16H 25/2021; F16H 2025/2037; B64C 13/341
See application file for complete search history.

(56) References Cited

U.S. PATENT DOCUMENTS

| | | |
|---|---|---|
| 6,585,228 B1 | 7/2003 | McCaskill |
| 8,146,858 B2 | 4/2012 | Port-Robach et al. |
| 8,146,868 B2 | 4/2012 | Bonnaud et al. |

(Continued)

FOREIGN PATENT DOCUMENTS

| | | |
|---|---|---|
| EP | 1958871 A1 | 8/2008 |
| FR | 2858035 A1 | 1/2005 |

(Continued)

OTHER PUBLICATIONS

Extended European Search Report for International Application No. 16306174.0 dated Mar. 29, 2017, 7 pages.

*Primary Examiner* — Jake Cook
(74) *Attorney, Agent, or Firm* — Cantor Colburn LLP (57) ABSTRACT

A failsafe bar connection of a screw actuator includes a failsafe bar for transmitting load via a secondary load path, the failsafe bar having a bar-end with a convex thrust surface; and an attachment part for coupling load to an aircraft structure, the attachment part having a socket for retention of the bar-end, the socket providing a concave thrust surface. A contact mechanism is provided to monitor relative displacement of the convex thrust surface within the concave thrust surface in a direction along an axis of the attachment part. In this way, changes in backlash and loading of the secondary load path can be detected. The contact mechanism comprises a protuberance extending from the bar-end along the main rotational axis of the failsafe bar and a displaceable contact surface provided by a displaceable member in the attachment part, the relative position of which is monitored by a displacement sensor.

19 Claims, 4 Drawing Sheets

(56) References Cited

U.S. PATENT DOCUMENTS

| | | | | |
|---|---|---|---|---|
| 2008/0196524 A1* | 8/2008 | Oberle | ............... | B60N 2/929 |
| | | | | 74/89.34 |
| 2008/0196965 A1* | 8/2008 | Oberle | ............... | B60N 2/929 |
| | | | | 180/384 |
| 2008/0265091 A1* | 10/2008 | Port-Robach | ....... | F16H 25/2021 |
| | | | | 244/99.4 |
| 2008/0315040 A1* | 12/2008 | Moalic | ............ | F16H 25/2021 |
| | | | | 244/220 |

FOREIGN PATENT DOCUMENTS

| JP | 2016022558 A | 2/2016 |
|---|---|---|
| WO | 2011134799 A1 | 11/2011 |

\* cited by examiner

FAILSAFE BAR CONNECTION

FOREIGN PRIORITY

This application claims priority to European Patent Application No. 16306174.0 filed Sep. 15, 2016, the entire contents of which is incorporated herein by reference.

TECHNICAL FIELD

The present disclosure relates to a connection for a failsafe bar of a screw actuator. It also relates to a failsafe bar and to an attachment part. It further relates to a method of monitoring the operation of a failsafe bar connection in a screw actuator, for example, to monitor for loading of the secondary load path.

BACKGROUND

Aircraft use a variety of actuators to move flaps or other flight control surfaces such as horizontal stabilizers, to vary the aerodynamics of the aircraft and control the aircraft during flight, takeoff, and landing. The actuators are often subjected to strong loads from aerodynamic forces and it is possible for the joint that connects the actuator to the main airframe to fail and the actuator (and possibly the flight control surface) to become separated from the aircraft. Another failure possibility is rupture of the screw shaft which could lead to separation of the parts. These would be considered "catastrophic events" from a safety standpoint according to the EASA CS25 certification standard for large commercial airplanes.

Consequently, many actuators have redundant connections to the airframe that are engaged if the primary load path of the actuator fails. One such connection is to a failsafe bar within a screw actuator. A failsafe bar may be attached to an airframe at one end and extend within a screw shaft of an actuator. The failsafe bar may be coupled to the screw shaft in such a way that the failsafe bar is not loaded during normal loading of the actuator, but becomes loaded and provides part of a secondary load path if the actuator's primary connection to the airframe fails. Backlash (play) may be provided at the ball joint level, for example, between the failsafe bar and its associated secondary lug (hereafter referred to as the "attachment part") fixed to the aircraft structure, for accommodating primary load path deflection in normal functioning conditions whilst preventing loading of the secondary load path.

It is now mandatory according to airworthiness regulations (e.g. EASA CS25) to have a means of detecting failure of the primary load path.

SUMMARY

According to a first aspect, the present disclosure can be seen to provide a failsafe bar connection of a screw actuator comprising: a failsafe bar for transmitting load via a secondary load path, the failsafe bar having a bar-end with a convex thrust surface; and an attachment part for coupling load to an aircraft structure, the attachment part having a socket for retention of the bar-end, the socket providing a concave thrust surface, wherein a contact mechanism is provided to monitor relative displacement of the convex thrust surface within the concave thrust surface in a direction along an axis of the attachment part.

Thus the contact mechanism may be used to monitor axial backlash between the convex thrust surface and the concave thrust surface through monitoring the relative displacement.

The contact mechanism may comprise a protuberance protruding from the bar-end. The protuberance may be arranged in point contact with a displaceable contact surface of the contact mechanism. The protuberance may be arranged in continuous point contact with the displaceable contact surface. The displaceable contact surface may be a biased surface which is biased towards the protuberance.

A point of contact between the protuberance and the displaceable contact surface may lie on an axis of rotation of the failsafe bar (the main rotation axis). As the parts pivot with respect to one another, the point of contact, will stay substantially on the axis of rotation of the failsafe bar (the point of contact will move to a small degree in view of the surface curvature).

The protuberance may comprise a convex distal portion. The protuberance may comprise a ball-shape. The protuberance may comprise a (generally) spherical outer surface which is for contacting the displaceable contact surface.

The protuberance may be sized to extend across a gap present, at least initially (e.g. prior to loading of the secondary load path) between the bar-end and the socket.

The displaceable contact surface may be movable in a direction along the axis of the attachment part, internally of the attachment part (i.e. it may be displaceable longitudinally within the attachment part). The displaceable contact surface may be part of a plunger (e.g. an end surface) or part of a lever (e.g. on a side surface) which is biased towards the protuberance on the bar-end.

The displaceable contact surface may be arranged centrally within the attachment part. The displaceable contact surface may be arranged to align with the concave thrust surface of the attachment part, at least initially. For example, it may provide a continuation of the socket surface.

The displaceable contact surface may be concave and have a same radius of curvature as the socket. Alternatively, the contact surface may be other shapes, such as flat.

The contact mechanism may comprise a displacement sensor which measures the displacement of a target to monitor the relative movement of the displaceable contact surface, and in turn, the relative displacement of the convex thrust surface within the concave thrust surface (i.e., relative displacement of the ball within the socket). The displacement sensor may have a sensing probe which is in contact with the target. The displacement sensor may be mounted externally on the attachment part, for ease of access. Alternatively, it may be mounted internally. The displacement sensor may comprise an LVDT sensor.

The contact mechanism may be arranged to monitor continuously the displacement of the convex thrust surface. It may monitor the displacement indirectly via the protuberance moving the displaceable contact surface, which in turn moves a target of the displacement sensor.

The contact mechanism may include a processor and/or may output a signal to a computer indicating a value for or a condition of the relative displacement of the convex thrust surface within the concave thrust surface.

The convex thrust surface of the bar-end may define a ball-shaped thrust surface which is retained with backlash within the thrust surface of the attachment part (i.e., the socket). The bar-end may be spherical or some other rounded shape.

The failsafe bar may be hollow. The failsafe bar may be in the form of a failsafe tube.

The failsafe bar may comprise a rotational connection at an end remote from the bar-end for engagement with the screw shaft, the rotational connection being arranged to transfer load to the failsafe bar in the event that the screw shaft ruptures.

Viewed from another aspect, the present disclosure may be seen to provide a method of monitoring the operation of a failsafe bar connection in a screw actuator, the method comprising: arranging a bar-end of a failsafe bar within a socket of an attachment part, the bar-end providing a convex thrust surface for transmitting load along a secondary load path through engagement of a concave thrust surface of the attachment part, characterised by monitoring the relative displacement of the convex thrust surface within the concave thrust surface in a direction along an axis of the attachment part using a contact mechanism.

The monitoring may comprise monitoring the movement of a displaceable contact surface in a direction along an axis of the attachment part, the movement being caused by a protuberance protruding from a bar-end of the failsafe bar along an axis of rotation of the failsafe bar. The protuberance may be in point contact with the displaceable contact surface. The point contact may be aligned with an axis of rotation of the failsafe bar.

The displaceable contact surface may be provided on a plunger or a lever and may be arranged for displacement along the axis of the attachment part and the method may include biasing the displaceable contact surface towards the protuberance. The displacement may follow a linear path directly along the axis of the attachment part or it may follow an arcuate path which has a predominant component along the axis of the attachment part.

The monitoring may comprise using a displacement sensor, for example, an LVDT sensor, to detect relative displacement of the convex thrust surface through measuring displacement of a target linked to the displaceable contact surface.

The displacement sensor and target may be provided externally of the attachment part, and wherein relative displacement of the convex thrust surface is conveyed to the displacement sensor via part of a displaceable member which extends through a hole in a wall of the attachment part. The displaceable member may comprise a plunger and the part may comprise a side arm extending from a body of the plunger. Alternatively, the displaceable member may comprise a lever and the part may comprise an end of the lever extending beyond a pivot opposite the displaceable contact surface.

The monitoring may be continuous monitoring. It may include outputting a signal to a computer, both during normal operation of a screw actuator and after loading via the secondary load path has begun.

The failsafe bar connection may be provided as part of a screw actuator. Thus, viewed from a further aspect, the present disclosure may be seen to provide a screw actuator comprising: a screwshaft; a nut arrangement; a failsafe bar provided within the screwshaft; a primary load path connection from the screwshaft for connection to an airframe; a secondary load path connection from the failsafe bar to an attachment part for connection to an airframe, wherein the connection from the failsafe bar to an attachment part is a failsafe bar connection as described above.

The screw actuator may be a flight control actuator. It may be part of a ballscrew assembly with two load paths (a failsafe actuator). The screw actuator may be a horizontal stabiliser trim actuator (HSTA).

Viewed from another aspect the present disclosure may be seen to provide a failsafe bar for such a failsafe bar connection or a screw actuator as described above. It may be seen to provide a failsafe bar for a screw actuator, the failsafe bar comprising a bar-end for coupling with an attachment part for transmitting load from a secondary load path into an airframe, wherein the bar-end comprises a convex thrust surface and has a protuberance protruding from the bar-end along an axis of the failsafe bar for providing a contact member of a contact mechanism.

Viewed from yet a further aspect the present disclosure may be seen to provide an attachment part for such a failsafe bar connection or a screw actuator as described above. It may be seen to provide an attachment part for coupling load from a failsafe bar into an airframe, wherein the attachment part comprises a socket for retention of a bar-end of a failsafe bar, the socket providing a concave thrust surface for receiving load from the bar-end, wherein the attachment part comprises a displaceable contact surface that is moveable along an axis of the attachment part, internally of the attachment part. The displaceable contact surface may be provided on a displaceable member in the form of a spring-biased plunger or a lever. Part of the displaceable member may extend through a hole in the attachment part, to convey the relative movement of the displaceable contact surface within the attachment part to a sensor arranged externally of the attachment part.

DESCRIPTION OF THE FIGURES

Certain embodiments of the present disclosure will now be described in greater detail by way of example only and with reference to the accompanying drawings in which.

DETAILED DESCRIPTION

Figure 1:
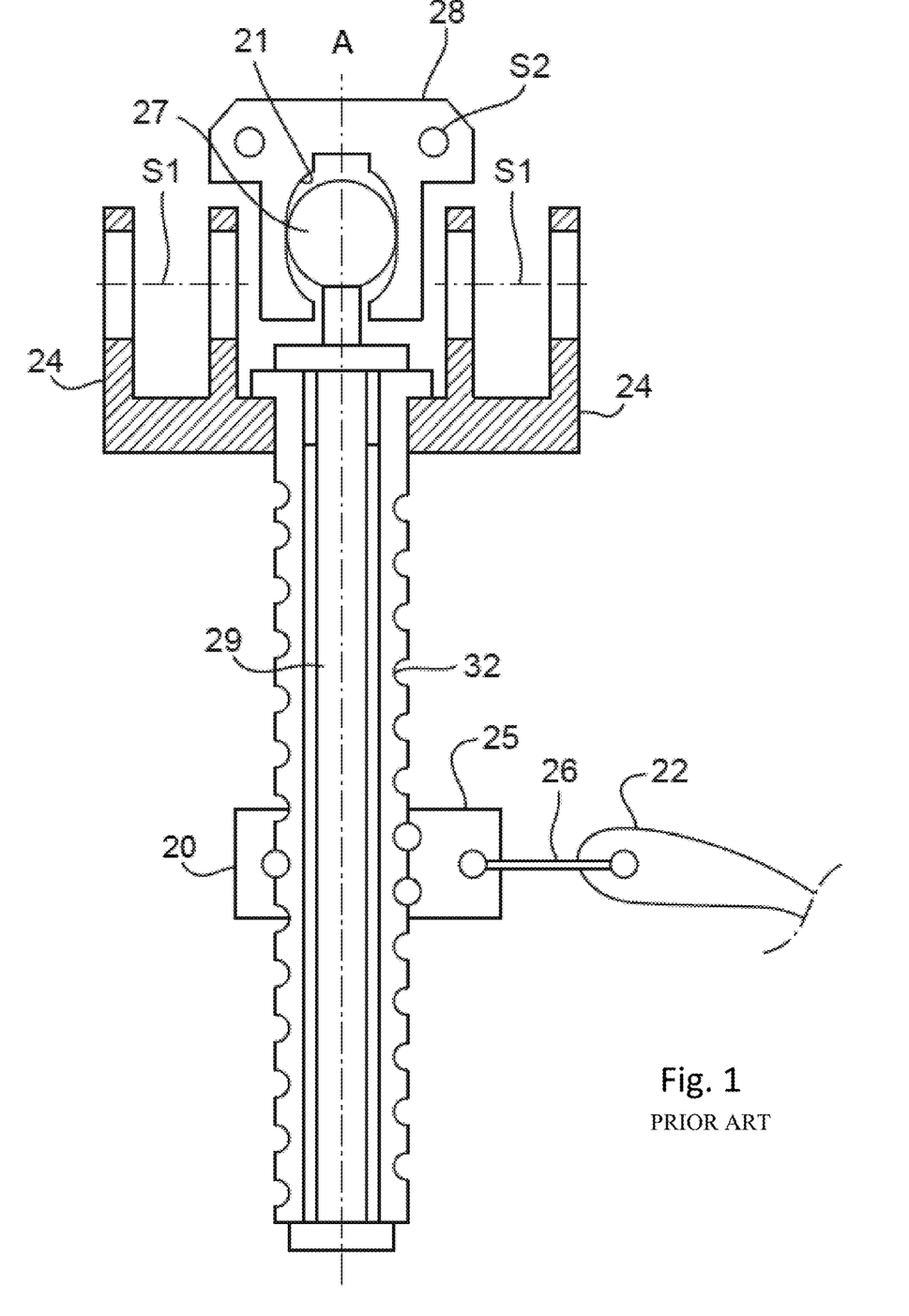
FIG. 1 shows a known ballscrew actuator having a failsafe bar and attachment part.

FIG. 1 shows a schematic representation of a known screw actuator 20. The actuator 20 comprises a failsafe bar 29 extending within the screw shaft 32 to take the load should the primary load path fail. The primary load path is provided through the screw shaft 32 being connected to a mounting bracket 24 which connects to an airframe at point S1. The connection to the airframe may be, for example, a Cardan joint. A nut 25 of the screw actuator connects via a shaft 26 to a movable flap 22 of the aircraft. Such flaps may be subject to significant aerodynamic loading during flight, takeoff, and landing. These aerodynamic forces load the screw shaft along its axis A, and thus load the mounting bracket 24.

The failsafe bar 29 is loosely connected to the screw shaft, e.g. by grooves interacting with splines on the inner surface of the screw shaft (not shown). The splines may sit in the grooves with axial play such that the failsafe bar 29 does not receive axial loads from the screw shaft 32 during normal operation of the actuator. That is, the gap between the splines and the end of the grooves in which they sit is greater than the axial compression and extension tolerances of the mounting bracket 24 and the screw shaft 32.

At one end, the failsafe bar 29 has a bar-end 27, which is in the form of a bulbous male member. This is received, with play, within a socket 21 of an attachment part 28 that is mounted to the airframe at point(s) S2 to provide a ball and socket connection.

The splines may transmit rotational motion of the screw shaft 32 to the failsafe bar 27 such that the bar-end 27 rotates within the socket 21 during normal operation when the primary load path is active. Thus, the bar-end 27 may need to rotate freely within the socket 21 during normal flight operations.

If the mounting bracket 24 fails (i.e. comes loose from the airframe), such as from excessive aerodynamic loading of the flap 22, or the secondary load path becomes active through rupture of the screw shaft, then the failsafe bar 29 takes up the load and keeps the actuator 20 mounted to the airframe. Thus, the failsafe bar 29 provides a secondary load path for use in the event of failure of the primary load path, e.g., at the point S1 or midway along the screw shaft 32. The secondary load path can be seen as the path that passes from the airframe, via attachment points S2, through the socket 21 of the attachment part 28, into the bar-end 27, along the failsafe bar 29, and into the screw shaft 32 and componentry associated with the flap 22.

Thus, the failsafe bar 29 and attachment part 28 shown in FIG. 1 can be seen to provide a safety arrangement in the event of failure of the mounting bracket 24 and/or the screw shaft 32.

Figure 2:
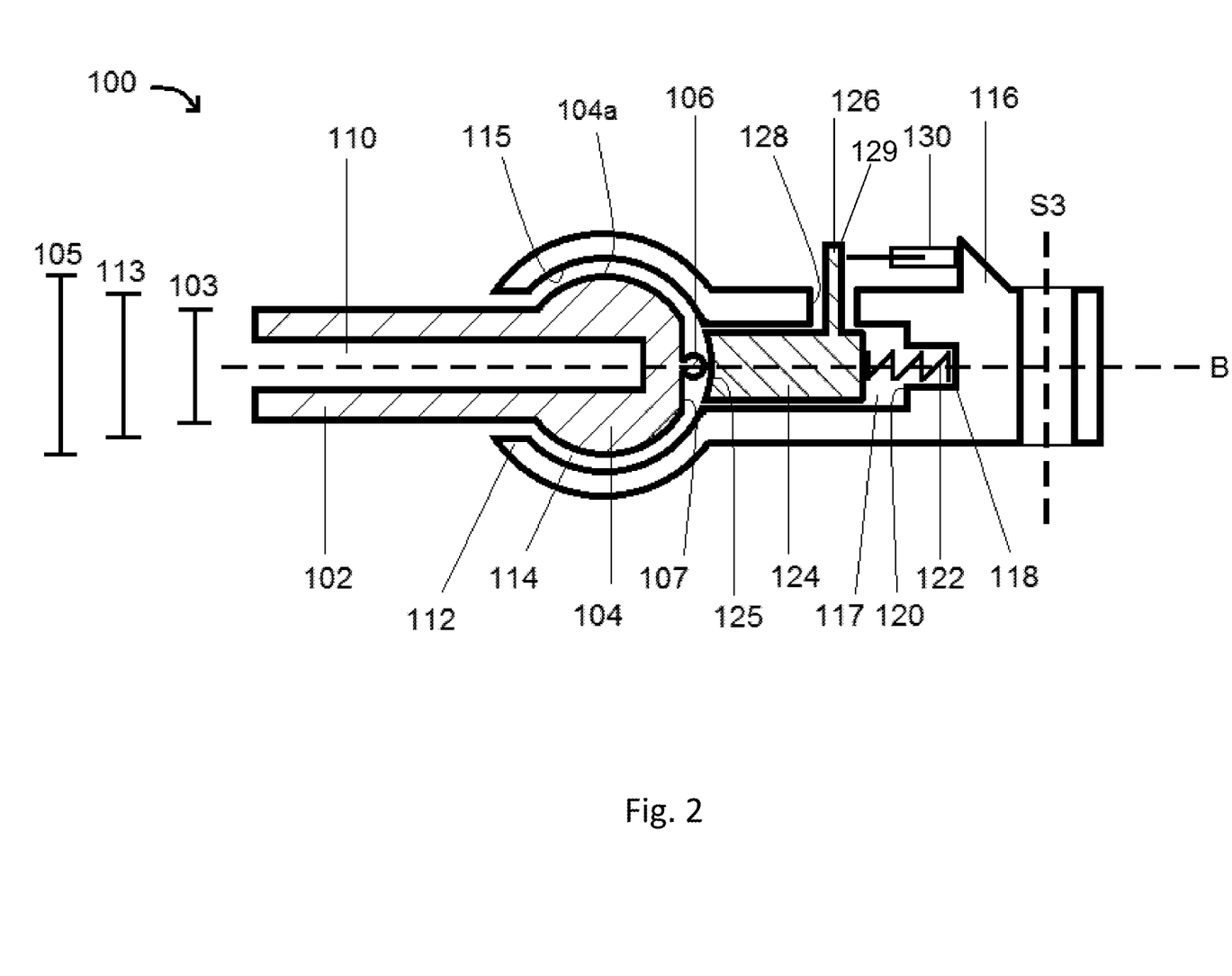
FIG. 2 shows a failsafe bar and attachment part having a contact mechanism for monitoring loading of the secondary load path.

FIG. 2 shows a schematic representation of an exemplary failsafe bar connection 100 in accordance with the present disclosure. The failsafe bar connection 100 could, for example, be incorporated in a screw actuator as shown in FIG. 1.

The failsafe bar connection 100 comprises a failsafe bar 102 and an attachment part 116, which together provide a ball and socket connection that can allow rotation of the failsafe bar 102 about a main rotational axis of the failsafe bar (which generally corresponds to a longitudinal axis B of the attachment part 116 shown in FIG. 2). It can also allow a degree of pivotal movement between the failsafe bar 102 and the attachment part 116.

The failsafe bar 102 may have a bar-end 104 at one end which defines a convex thrust surface 104a. The bar-end 104 may be substantially ball-shaped or bulbous. It may spherical as shown or may have some ovality to the profile.

The bar-end 104 is retained within a socket 114 of an attachment part 116. The socket 114 may have an internal surface shape which generally corresponds to the bar-end 104 of the failsafe bar 102. The diameter 113 of the socket opening 112 may be smaller than the maximum diameter 105 of the bar-end 104, and larger than the diameter 103 of the failsafe bar 102. This arrangement ensures that the bar-end 104 is held within the socket 114 of the attachment part 112 when the failsafe bar 102 is loaded and the secondary load path has become active. The socket 114 may be provided by a plurality of sections that enclose the bar-end 104.

Through this ball and socket arrangement, the socket 114 may allow rotation of the failsafe bar 102 about its longitudinal axis (which generally corresponds to a longitudinal axis B of the attachment part 116), and may allow a limited amount of angular displacement (pivoting) too of the failsafe bar 102 away from the longitudinal axis B of the attachment part 116, for example, 3° or more, 5° or more, or even up to 10° or more, to accommodate movement in the nut 25 of the screw actuator 20 as the flight control surface 22 or other component is moved.

To transmit load when the secondary load path begins to become active, the socket 114 is provided with a concave thrust surface 115 to engage the convex thrust surface 104a of the failsafe bar 102. The concave thrust surface 115 may generally correspond in shape to the convex thrust surface 104a (with allowance made for backlash, e.g., which may be about 3 mm clearance or so around the bar-end).

According to the present disclosure, a contact mechanism is provided in the failsafe bar connection to monitor relative displacement of the convex thrust surface within the concave thrust surface in a direction along an axis of the attachment part 116. In this way, the position of the failsafe bar 102 (which rotates during the screw actuator movements) relative to the attachment part 116, can be continuously monitored. The backlash between the two parts that are in relative movement can be continuously monitored through the contact mechanism with minimal risk of wear.

The contact mechanism may be provided by a modification to the bar-end 104, namely a protuberance 106 which extends along the main axis of rotation of the failsafe bar 102 and is arranged to interact with a displaceable contact surface 125 of the attachment part 116. In this way, the parts which are in contact with one another are substantially aligned with the main axis of rotation of the failsafe bar and the contact areas are kept to a minimum.

As can be seen in FIG. 2, the bar-end 104 of the failsafe bar 102 may be provided with a generally ball-shaped protuberance 106 extending from the bar-end 104. The protuberance 106 protrudes beyond the curvature of the convex thrust surface 104a, in particular in a direction along a rotational axis of the failsafe bar (which is the same as longitudinal axis B in FIG. 2 but would be different when the failsafe bar 102 is pivoted out of axial alignment with the attachment part 116).

The bar-end 104 may have a flat end surface 107 that supports the protuberance 106. The protuberance 106 may resemble a nub or nubbin, or a ball-bearing, which projects beyond the curvature of the bar-end 104. It may sit at the intersection of the plane of the flat end surface 107 and the axis of the failsafe bar 102. The protuberance 106 may be formed integrally with the failsafe bar 102, or may be affixed thereto (e.g. by welding, soldering, adhesive, mechanical attachment, etc.). The protuberance 106 may be provided by the head of a pin member, a shank of which extends into the bar-end 104 to secure the protuberance 106. Room provided by the flat end surface 107 may assist in setting the curvature and bearing properties of the protuberance 106.

Thus, the protuberance 106 may have a convex distal surface which is for contacting a displaceable contact surface 125 of a displaceable member 124 provided within the attachment part 116. The protuberance 106 and displaceable member 124 with its displaceable contact surface 125 may together provide the main parts of the contact mechanism.

The protuberance 106 may be sized to maintain continuous contact with the displaceable contact surface 125 during normal flight conditions and when the secondary load path has started to become active. The protuberance 106 may be sized so as to extend across a gap which is present, at least initially, between the thrust services 104a, 115 in a direction along the axis B of the attachment part 116, and any additional space provided by a flat (or other profile) end surface 107.

As shown in FIG. 2, the displaceable member 124 may be in the form of a spring-biased plunger 124 which is biased towards the convex thrust surface 104a of the bar-end 104. The protuberance 106 may bear against a displaceable contact surface 125 provided at one end of the plunger 124 rather than the convex thrust surface 115 of the socket 114.

The protuberance 106 may be in point contact with the displaceable contact surface 125 of the plunger 124. The protuberance 106 may be, for example, a sphere, an ovoid, a bullet shape, a rounded point, a conical projection or any other shape that provides a small contact area with the plunger 124. It may comprise a convex distal portion which is in contact with the displaceable contact surface. The surface of the protuberance 106 is distinct from that of the bar-end 104.

The bar-end 104 may be slightly smaller than the concave thrust surface 115 of the socket 114. There may be a certain amount of backlash (play) between the thrust surfaces 104a, 115 of the bar-end 104 and the socket 114, for example, 1 mm or more, may be 2 mm or more.

The interaction of the protuberance 106 and the displaceable contact surface 125 provide a contact mechanism which can monitor backlash between the thrust surfaces 104a, 115 in a direction along the axis B of the attachment part 116. The contact mechanism may additionally include a sensor 130 which will be described in more detail below.

The protuberance 106 may maintain engagement with the displaceable contact surface 125 of the plunger 124 at all times. As the failsafe bar 102 pivots with respect to the attachment part 116, the point contact will track across the displaceable contact surface 125.

In the situation where the protuberance 106 is spherical, a diameter of the protuberance 106 may correspond to, or be greater than, a separation between the bar-end 104 and the socket 114. In the arrangement shown in FIG. 2, the diameter is shown larger than the gap between the corresponding thrust surfaces 104a, 115 and being equal to the separation of the flat end surface 107 from a continuation of the concave surface provided by the concave contact surface 125 of the plunger 124.

In FIG. 2, the displaceable member 124 is in the form of a spring-biased plunger which is housed within a recess 117, e.g., a cylindrical recess, extending along the axis B of the attachment part 116. The plunger 124 may be arranged to reciprocate within the plunger recess 117 along the axis B of the attachment part 116 against a biasing force provided by spring 122.

The plunger 124 may be centrally positioned within the concave thrust surface 115 of the socket 114, such that the displaceable contact surface 125 of the plunger 124 forms a continuation of the concave thrust surface 115 in a region surrounding the axis B of the attachment part 116. Thus, the displaceable contact surface 125 of the plunger 124 may be concave and may have the same or similar radius of curvature as the concave thrust surface 115.

The displaceable contact surface 125 may be arranged to directly face the protuberance 106 and the bar-end 104 of the failsafe bar 102 when they are in axial alignment. The displaceable contact surface 125 may have a circular perimeter or be otherwise configured so that the protuberance 106 always rides over and in contact with the displaceable contact surface 125, regardless of the relative axial orientations of the failsafe bar 102 and the attachment part 116, during normal operation of the screw actuator.

The plunger 124 may be biased towards the bar-end 104 by a spring 122. This may be in the form, for example, of a helical spring 122, which may be supported within a spring recess 118, which is of smaller diameter, within the attachment part 116 acting on an opposite end of the plunger 124 to the protuberance 106. An end of the cylindrical plunger recess 117 may provide a shoulder 120 with the spring recess 118 to limit displacement of the plunger 124 into the attachment part 116 under compression.

The plunger 124 and the biasing provided by spring 122 may also be arranged to take up backlash in the opposite direction, with the displaceable contact surface 125 being able to extend slightly into the socket 114 when the load is trying to pull the bar-end 104 from the socket 114, i.e., when the failsafe bar 102 is acting in tension.

In other words, the contact mechanism may be arranged so that the opposed parts maintain continuous contact when load (positive or negative) is being passed via the failsafe bar 102 and the secondary load path into the aircraft frame.

The plunger 124 may be generally cylindrical in shape (except for an arm 126 extending transversely from the plunger 124, described below). The cylindrical shape of the plunger 124 may match the shape of the cylindrical plunger recess 117, to allow it to slide freely within the recess 117.

A hole 128 may extend through a wall of the attachment part 116, from the outside to the plunger recess 117. The hole 128 may be a slot of any suitable shape to allow an arm 126 of the plunger 124 to extend through and provide sufficient clearance for the plunger 124 to move with respect to the attachment part 116 when monitoring the backlash.

A sensor 130 may be mounted to the attachment part 116. A support may be provided for one end of the sensor 130, which may be a formation in the attachment part 116. The sensor 130 may comprise a sensor probe which extends from the body of the sensor to a target 129 on a surface on the arm 126 of the plunger 124. The sensor 130 may measure the relative displacement of the arm 126 as the plunger 124 reciprocates within the plunger recess 117. In effect, the sensor 130 is able to measure the axial position of the plunger 124 within the plunger recess 117.

The sensor 130 may be any form of distance sensor, particularly an electronic sensor. For example, it may be an LVDT sensor. Mounting it on a side of the attachment part 116 allows it to be checked easily for functionality and replaced simply without requiring disassembly of the screw actuator 20 or the failsafe bar connection 100.

The sensor 130 may output a signal, e.g. to a controller (e.g., a flight control computer), that may determine a measurement value for the distance signal and alert a pilot or ground crew when movement is detected. This might be an indication that the mounting bracket 24 of the screw actuator 20 may be about to fail or has failed, since in normal operation, the failsafe bar 102 is not loaded.

The sensor 130 may provide a continuous output of the position of the plunger 124 within the plunger recess 117. This output may be passed to a controller (e.g. control electronics, computer, etc.) or to a pilot or ground crew as desired. That is, the sensor 130 together with the other parts of the contact mechanism may provide continuous monitoring of the secondary load path, both before and during loading of the failsafe bar 102.

The attachment part 116 may be attached to an airframe at a distal end, for example by a pin, clevis, or other connection at location S3. This coupling to the airframe may provide a strong attachment for the failsafe bar 102 and thus a strong secondary load path for the actuator in the event that the primary load path fails.

The exemplary attachment part 116 and failsafe bar 102 described herein may be used in the known actuator setup of FIG. 1, or in other suitable actuators.

As described above, the failsafe bar 102 will rotate with the screw shaft 32. Consequently, the protuberance 106 will rotate against the displaceable contact surface 125 of the plunger 124 for extended periods of operation. To minimize wear on either the displaceable contact surface 125 or the protuberance 106, the contact area is kept as small as possible. The protuberance 106 may be in point contact with the displaceable contact surface 125 of the plunger 124. The point contact may be located on the main rotational axis of the failsafe bar 102 to further limit the risk of wear.

The protuberance 106 extending in a direction along an axis of the failsafe bar 102 also maintains a constant reading in the displacement sensor 130 as the protuberance 104 follows the curve of the plunger's contact surface 125 during pivotal movement of the failsafe bar 102 with respect to the attachment part 116.

The backlash (play) between the thrust surfaces 104a, 115 of the bar-end 104 and socket 114 respectively may be more than 1 or 2 mm of axial movement, and can represent approximately 3 to 5 mm of total axial movement and possibly more. The extension of the protuberance 106 beyond a projected curve of the convex thrust surface 104a towards the contact surface 125 of the plunger 124 may correspond to half the total axial movement. The amount of total axial movement may be less than or equal to the total travel-length of the plunger 124 within the plunger recess 117 (which may be set by movement allowed by the arm 126 within the hole 128 or by other formations).

Figure 3:
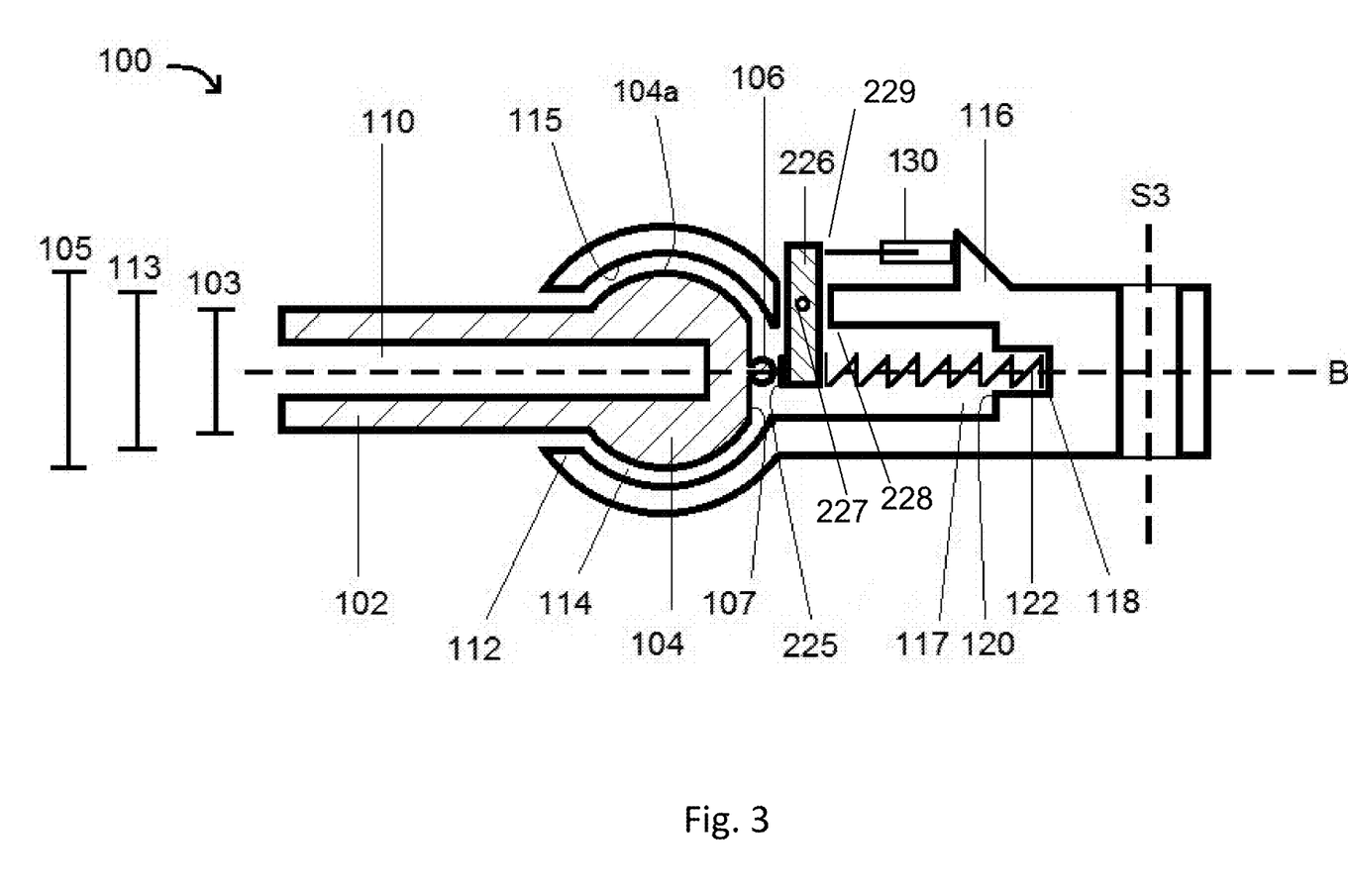
FIG. 3 shows a failsafe bar and attachment part having an alternative contact mechanism for monitoring loading of the secondary load path.

In an alternative design, shown in FIG. 3, the displaceable member 124 may be in the form of a lever 226 arranged to pivot about a pivot axis. The lever 226 may extend into the recess 117 and an end for contacting the protuberance 106 may be biased towards it by a spring 122. The lever 226 may be provided with a displaceable contact surface 225 where it is aligned with the protuberance 106. This may be concave hollow as with the embodiment of FIG. 2 or it may be a flat or flatter surface on a side of the lever 126.

The displaceable contact surface 225 is moved by the action of the protuberance 106 in a similar way to the FIG. 2 arrangement, except that this time the displacement in a direction along the axis B of the attachment part 116 is an actuate movement about a pivot 227 rather than a direct linear displacement (the movement is predominantly along the axis B of the attachment part 116).

The lever 226 may be pivoted at a point towards the middle of the lever as shown, e.g. where it passes through a hole 228 in the wall of the attachment part 116. At an end on the other side of the pivot 227 to the displaceable contact surface 225, the lever 226 may provide a target 229 for the displacement sensor 130. Similar to the action of the first design shown in FIG. 2, when the bar-end of the failsafe bar 102 moves within the socket 114, the lever 226 will change angle to maintain contact with the protuberance (due to the biasing force of the spring 122). The change of angle causes the other end to move towards/away from the displacement sensor 130, and this movement is detected in the same manner as with the first design shown described with respect to FIG. 2.

All other features of the FIG. 3 embodiment are similar to the FIG. 2 arrangement and so will not be described in further detail here.

In all arrangements, the failsafe bar 102 may have a hollow interior 110; it may be in the form of a failsafe tube. This may substantially reduce the weight of the failsafe bar 102. The tube may be closed off at the bar-end 104 as shown in the figures.

Figure 4:
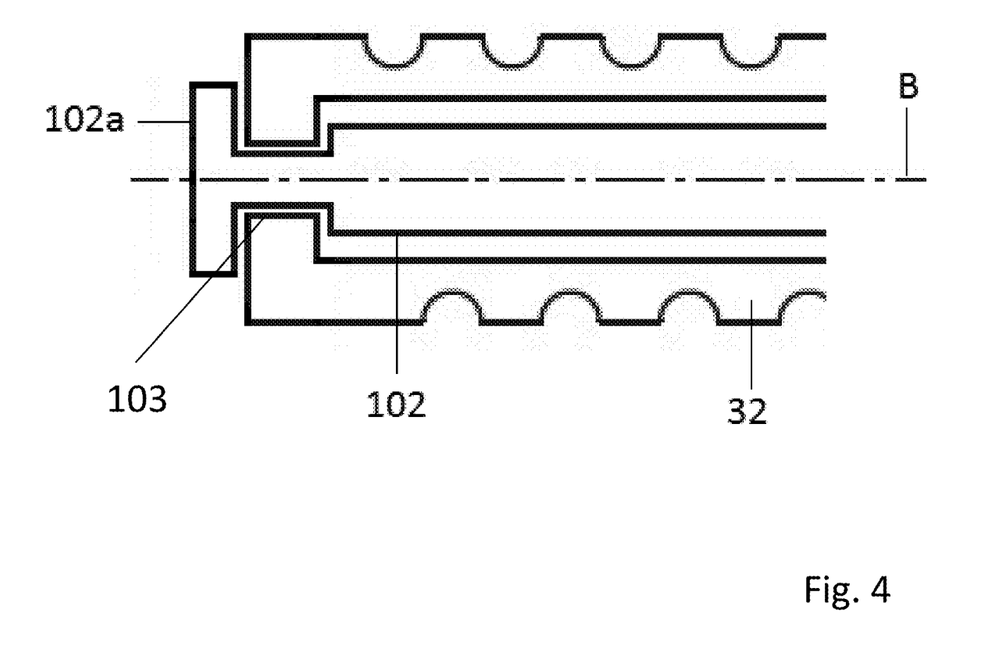
FIG. 4 shows a rotational connection of a failsafe bar to a screw shaft at an end remote from the bar-end.

In order to be able to transmit load via the failsafe bar 102 when the screw shaft 32 ruptures, the failsafe bar 102 may be provided with a rotational connection 103 at an end 102a remote from the bar-end 104, as shown in FIG. 4. The rotational connection 103 is arranged to allow a certain amount of play between the failsafe bar 102 and the screw shaft 32 before load is transferred to the failsafe bar 102.

The following clauses provide alternative definitions of the present disclosure which may serve as basis for amendments or possible divisional applications:

1. A secondary load path comprising a ball and socket connection, wherein the ball comprises a protuberance projecting from a surface of the ball along a main axis of rotation, the protuberance providing a first contact part of a contact mechanism arranged to monitor activation of the secondary load path.

2. A secondary load path as recited in clause 1, wherein the contact mechanism comprises a second contact part in the form of a displaceable contact surface which is biased towards the protuberance and is displaced by the protuberance upon activation of the secondary load path.

3. A secondary load path as recited in clause 2, wherein the protuberance is in point contact with the displaceable contact surface.

4. A secondary load path as recited in clause 3, wherein the protuberance comprises a convex distal portion, and preferably wherein the protuberance comprises a ball-shape.

5. A secondary load path as recited in any preceding clause, wherein the displaceable contact surface is provided on a displaceable member which is linked to a displacement sensor to monitor displacement of the protuberance.

6. A secondary load path as recited in clause 5, wherein the displaceable member comprises a spring biased plunger.

7. A secondary load path as recited in clause 5, wherein the displaceable member comprises a spring biased lever.

8. A secondary load path as recited in any of clauses 5 to 7, wherein the displacement sensor is mounted externally and the displaceable member provides a target for the displacement sensor.

9. A secondary load path as recited in any preceding clause, wherein the ball and socket connection comprises a failsafe bar connection of a screw actuator, and the secondary load path comprises a failsafe bar and an attachment part for coupling load to an aircraft structure.

10. A secondary load path as recited in clause 9, wherein the failsafe bar has a bar-end with a convex thrust surface and the attachment part has a socket for retention of the bar-end, the socket providing a concave thrust surface.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A failsafe bar connection of a screw actuator comprising:
a failsafe bar for transmitting load via a secondary load path, the failsafe bar having a bar-end with a convex thrust surface; and
an attachment part for coupling load to an aircraft structure, the attachment part having a socket for retention of the bar-end, the socket providing a concave thrust surface,
wherein a contact mechanism is provided to monitor relative displacement of the convex thrust surface within the concave thrust surface in a direction along an axis of the attachment part;
wherein the contact mechanism comprises a protuberance protruding from the bar-end which is in point contact with a displaceable contact surface of the contact mechanism.

2. A failsafe bar connection as claimed in claim 1, wherein the point contact lies on an axis of rotation of the failsafe bar.

3. A failsafe bar connection as claimed in claim 1, wherein the protuberance comprises a convex distal portion.

4. A failsafe bar connection as claimed in claim 1, wherein the protuberance is sized to extend across a gap present, at least initially, between the bar-end and the socket.

5. A failsafe bar connection as claimed in claim 1, wherein the displaceable contact surface is moveable in a direction along the axis of the attachment part, internally of the attachment part.

6. A failsafe bar connection as claimed in claim 5, wherein the displaceable contact surface is part of a plunger or a lever which is biased towards the protuberance.

7. A failsafe bar connection as claimed in claim 1, wherein the displaceable contact surface is arranged centrally within the attachment part.

8. A failsafe bar connection as claimed in claim 1, wherein the contact mechanism comprises a displacement sensor which measures the displacement of a target to monitor the relative movement of the displaceable contact surface and in turn the relative displacement of the convex thrust surface within the concave thrust surface.

9. A method of monitoring the operation of a failsafe bar connection in a screw actuator, the method comprising:
arranging a bar-end of a failsafe bar within a socket of an attachment part, the bar-end providing a convex thrust surface for transmitting load along a secondary load path through engagement of a concave thrust surface of the attachment part,
characterised by monitoring the relative displacement of the convex thrust surface within the concave surface thrust surface in a direction along an axis of the attachment part using a contact mechanism;
wherein the monitoring comprises monitoring the movement of a displaceable contact surface in a direction along the axis of the attachment part, the movement being caused by a protuberance protruding from a bar-end of the failsafe bar along an axis of rotation of the failsafe bar.

10. A method as claimed in claim 9, wherein the protuberance is in point contact with the displaceable contact surface, the point contact preferably lying on an axis of rotation of the failsafe bar.

11. A method as claimed in claim 10, wherein the displaceable contact surface is provided on a plunger or a lever and is arranged for displacement along the axis of the attachment part and the method includes biasing the displaceable contact surface towards the protuberance.

12. A method as claimed in claim 9, wherein the monitoring comprises using a displacement sensor to detect relative displacement of the convex thrust surface through measuring displacement of a target linked to the displaceable contact surface.

13. A method as claimed in claim 12, wherein the displacement sensor and target are provided externally of the attachment part, and wherein relative displacement of the convex thrust surface is conveyed to the displacement sensor via a portion of a displaceable member which extends through a hole in a wall of the attachment part.

14. A method as claimed in claim 9, wherein the monitoring comprises continuous monitoring.

15. A failsafe bar connection as claimed in claim 1, wherein the protuberance comprises a ball-shape.

16. A failsafe bar connection as claimed in claim 7, wherein the displaceable contact surface is arranged to align with the concave thrust surface of the attachment part, at least initially.

17. A failsafe bar connection as claimed in claim 8, wherein the displacement sensor is mounted externally on the attachment part, and/or wherein the sensor comprises an LVDT sensor.

18. A method as claimed in claim 10, wherein the point contact lies on an axis of rotation of the failsafe bar.

19. A method as claimed in claim 14, wherein the continuous monitoring comprises outputting a signal to a computer, both during normal operation of a screw actuator and after loading via the secondary load path has begun.

* * * * *